United States Patent [19]

Felburn

[11] 4,453,761
[45] Jun. 12, 1984

[54] PANEL-SIDED VEHICLE CONVERTIBLE TO FLATBED VEHICLE

[76] Inventor: J. Phil Felburn, P.O. Box 2344, Arlington, Va. 22202

[21] Appl. No.: 364,948

[22] Filed: Apr. 2, 1982

[51] Int. Cl.³ .............................................. B60P 1/64
[52] U.S. Cl. ...................................... 296/43; 296/182; 105/375; 105/382
[58] Field of Search ................ 296/32, 36, 10, 13, 296/14, 43, 50, 182, 180, 181, 183, 27, 24 R; 105/381, 386, 422, 375, 243, 370, 371, 372, 382; 410/50, 58, 36, 42, 44, 49, 104, 105, 108-110, 113-115, 126; 280/143, 639

[56] References Cited

U.S. PATENT DOCUMENTS

| 913,237 | 2/1909 | Rodebaugh | 296/27 |
|---|---|---|---|
| 2,077,649 | 4/1937 | Sweeley | 105/372 |
| 2,216,239 | 10/1940 | Haseltine | 105/375 |
| 3,481,627 | 12/1969 | Felburn | 410/50 |
| 3,788,684 | 1/1974 | Johnson et al. | 296/36 |
| 3,911,832 | 10/1975 | Vandergriff | 105/372 |
| 4,018,480 | 4/1977 | Stone | 105/243 |
| 4,042,275 | 8/1977 | Glassmeyer et al. | 296/36 |
| 4,221,427 | 9/1980 | Sentle, Jr. et al. | 296/181 |
| 4,405,169 | 9/1983 | Allard et al. | 296/14 |

Primary Examiner—Robert B. Reeves
Assistant Examiner—Dennis Pedder
Attorney, Agent, or Firm—Michael Williams; Warren N. Low

[57] ABSTRACT

My invention makes it possible to convert a flat bed vehicle into one having panel sides, and vice-versa. In flat bed arrangement, the panels are laid flatwise on the vehicle bed, each panel having a lug or cleat adapted to seat within a trough which is formed in the flat bed and which extends longitudinally thereof. This is an advancement of the structure disclosed and claimed in my prior U.S. Pat. No. 3,481,627.

10 Claims, 12 Drawing Figures

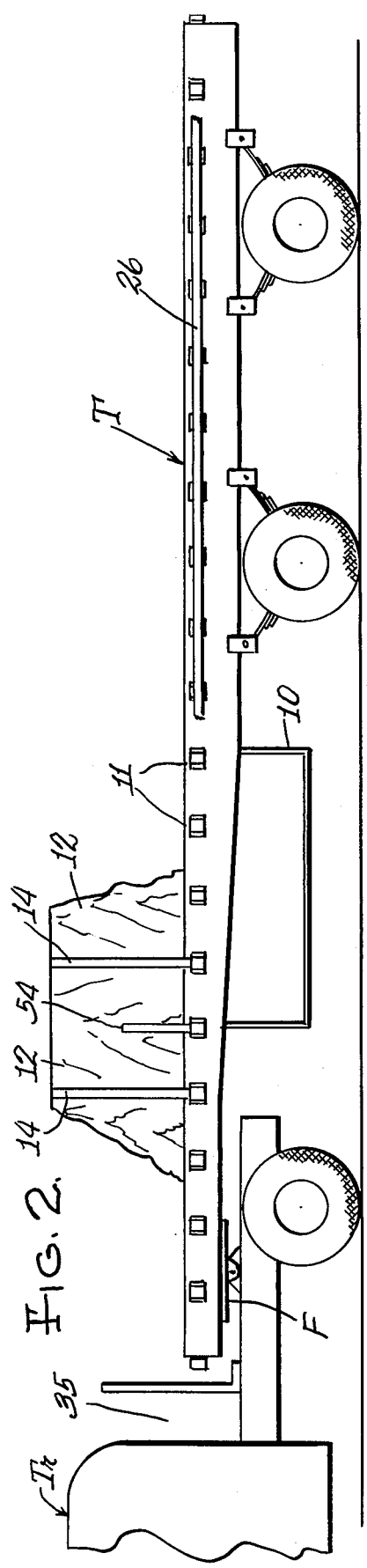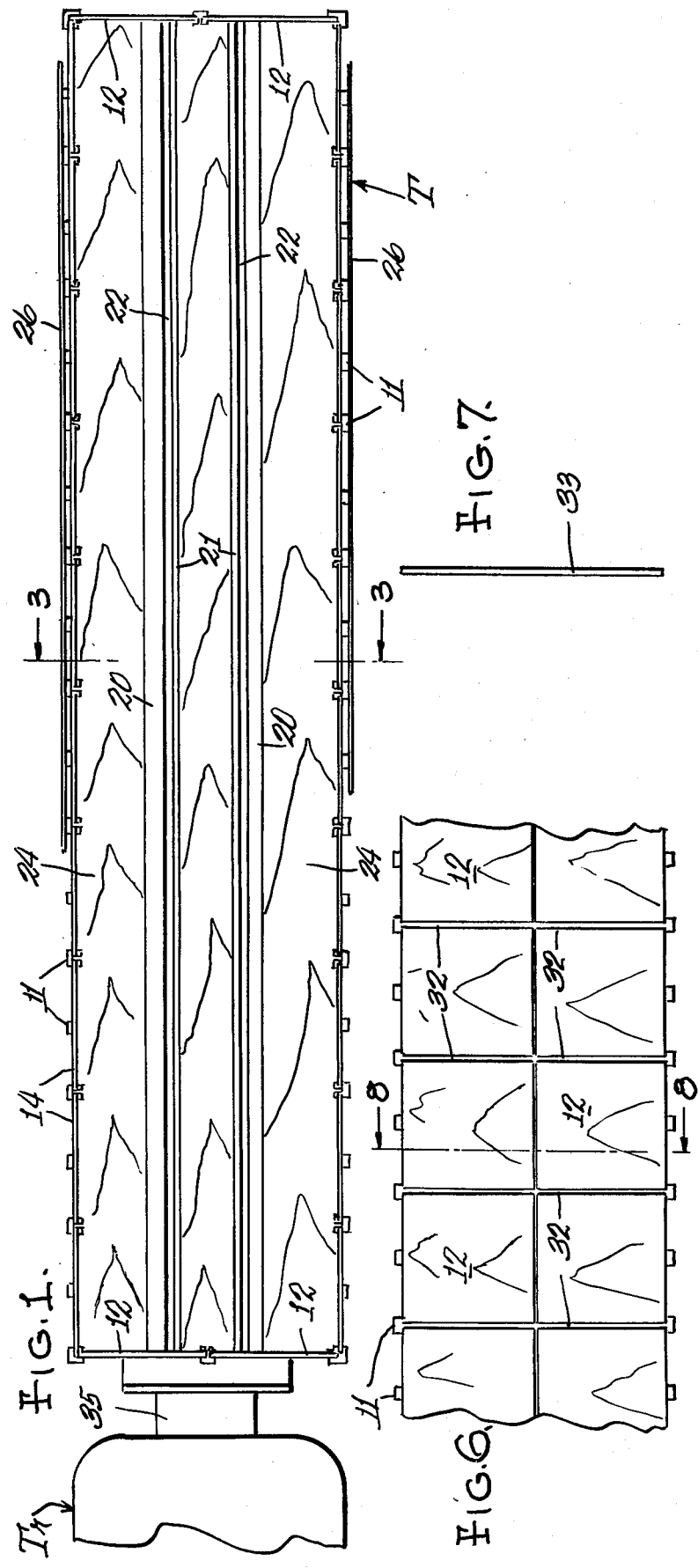

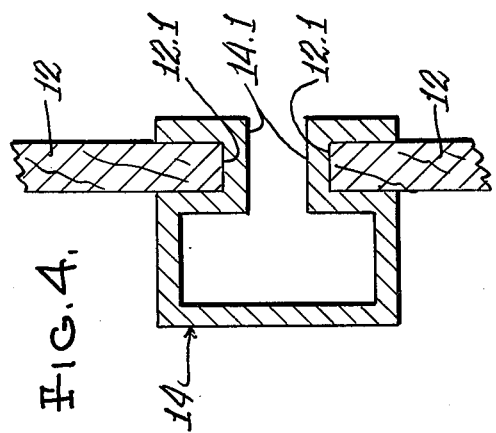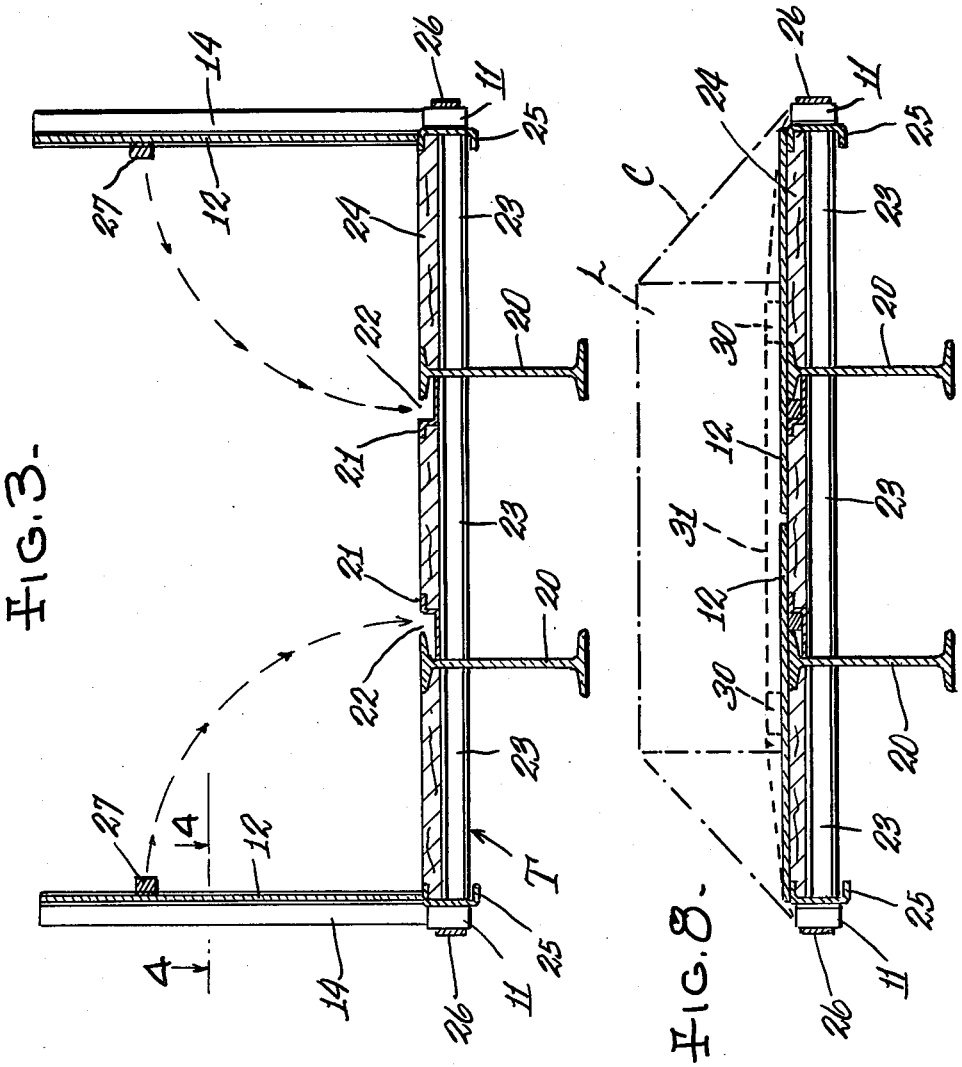

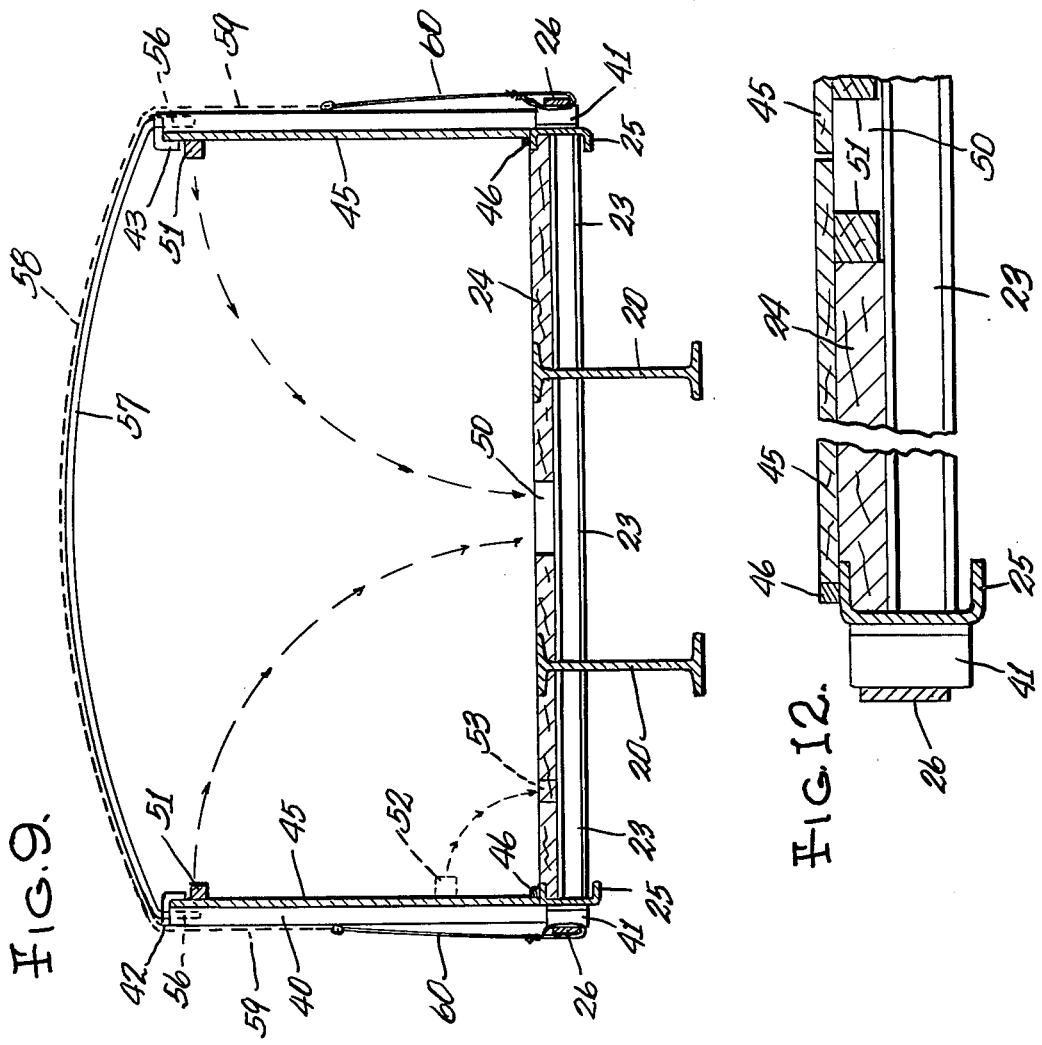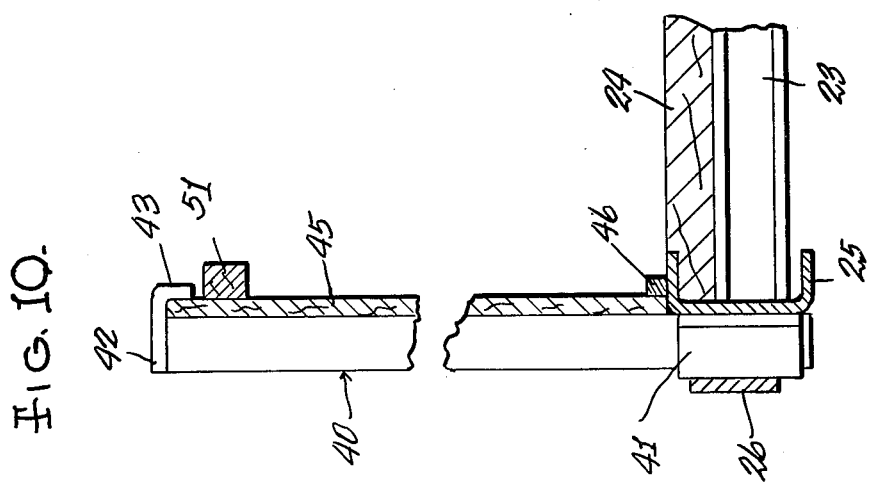

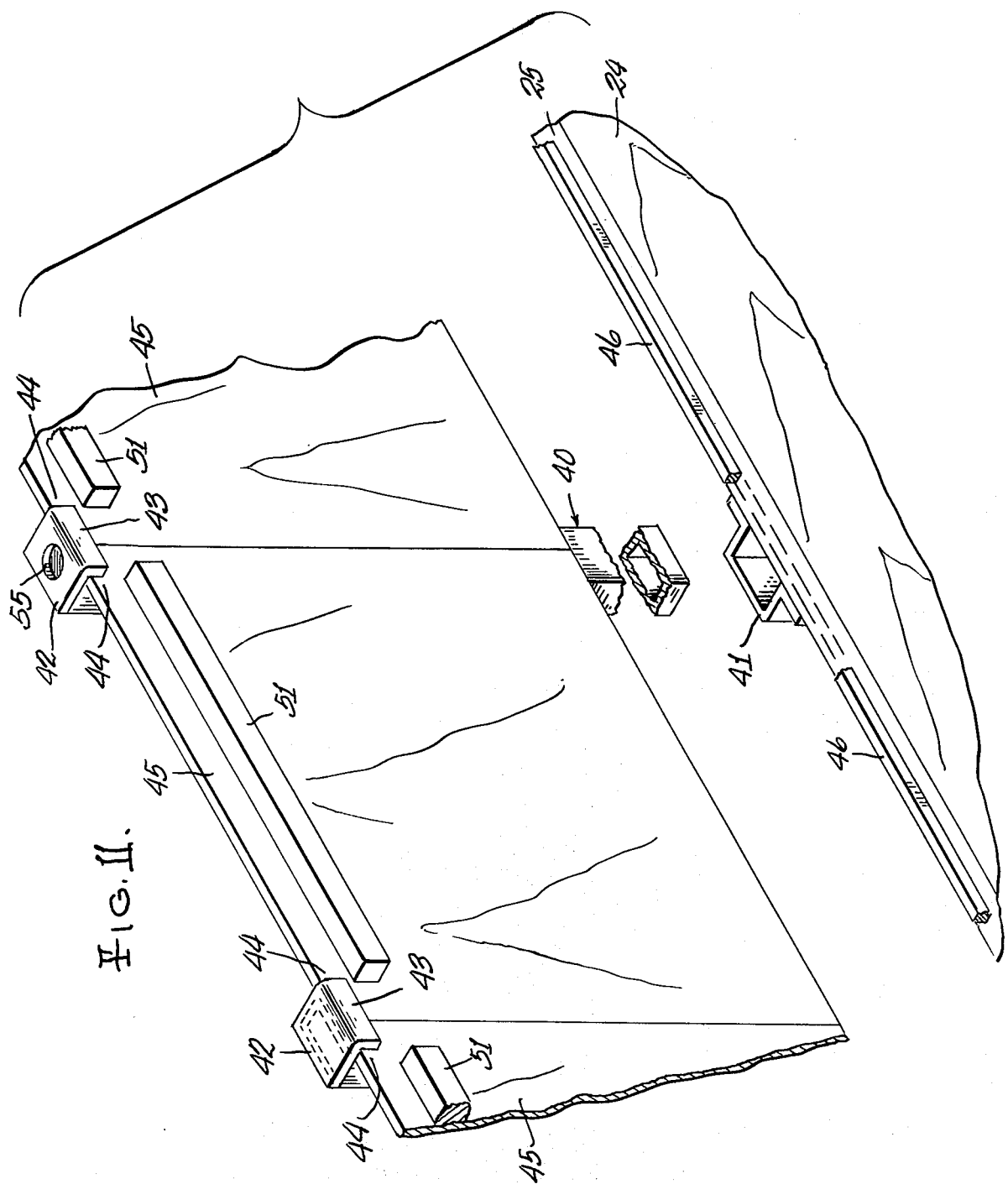

PANEL-SIDED VEHICLE CONVERTIBLE TO FLATBED VEHICLE

BACKGROUND AND SUMMARY

In my prior patent there is disclosed a trailer bed having a pair of troughs which are spaced laterally and extend longitudinally the full length of the bed. The structure disclosed in said patent solved the problem of hauling steel coils on trailers with the greatest degree of safety and with minimum damage to the coils.

I have discovered that the troughs shown in said patent may be used to perform an additional function, namely to receive cleats on side panels so that the latter may be stored in efficient manner. Heretofore, when a flat bed trailer (or truck) was to be transformed into a side panel bed, the panels were supported in upright position along the perimeter of the bed by means of stakes which seat in stake pockets in the usual manner.

The problem arose when it was desired to transform the side panel bed back to a flat bed, in that storage of the panels was very inconvenient. Heretofore, the panels were removed from the stakes and stored in a compartment located beneath the trailer or truck bed. This involved a lot of manual labor in the handling of the panels. Further, since the compartment was below the trailer bed, it accumulated considerable road dirt and also increased wind resistance to movement of the trailer.

In use of my invention the panels are laid flatwise on the bed, and held against shifting by means of cleats on the panels fitting within longitudinal troughs formed in the trailer bed. The problem of handling the panel for storage within a compartment is completely eliminated, as is the need for a compartment. Thus, a flat bed trailer may be easily converted to one having panel sides, and vice-versa. Frequently, a trucker has a request to haul flat bed products to a destination and there may not be any flat bed products for the return trip. However, if the trucker could convert his trailer to one having sides, with a minimum of labor, he would increase the opportunity for a two-way haul since his trailer would be available to haul articles which require panel sides.

In use of my invention, the panels are laid flatwise on the bed, and held against shifting by means of cleats on the panels fitting within longitudinal troughs formed in the trailer bed. The problem of handling the panels for storage within a compartment is completely eliminated, as is the need for a compartment.

DESCRIPTION OF THE DRAWINGS

In the drawings accompanying this specification and forming a part of this application there are shown, for purpose of illustration, several embodiments which my invention may assume, and in these drawings:

FIG. 1 is a top plan view of a trailer bed, with tractor fragmentally shown, the trailer bed having been transformed to one having side panels, FIG. 2 is a side elevational view of the trailer shown in FIG. 1, with the side panels fragmentarily shown, FIG. 3 is a sectional view corresponding to the line 3—3 of FIG. 1, the panels being shown in up position, FIG. 4 is an enlarged, sectional view, corresponding to the line 4—4 of FIG. 3, FIG. 6 is a fragmentary plan view showing the trailer bed with the panels disposed flatwise thereon, FIG. 7 is a plan view of a filler strip that may be used with the construction shown in FIG. 6, FIG. 8 is a sectional view corresponding to the line 8—8 of FIG. 6, FIG. 9 is a sectional view disclosing the same inventive concept as the foregoing but showing a different way of supporting the panels, FIG. 10 is an enlarged, broken sectional view to better illustrate the construction of FIG. 9, FIG. 11 is a fragmentary, separated perspective view of the construction shown in FIGS. 9 and 10, and FIG. 12 is a broken, fragmentary sectional view showing the panels flatwise on the trailer bed.

DESCRIPTION OF THE PREFERRED EMBODIMENT

Figure 5:
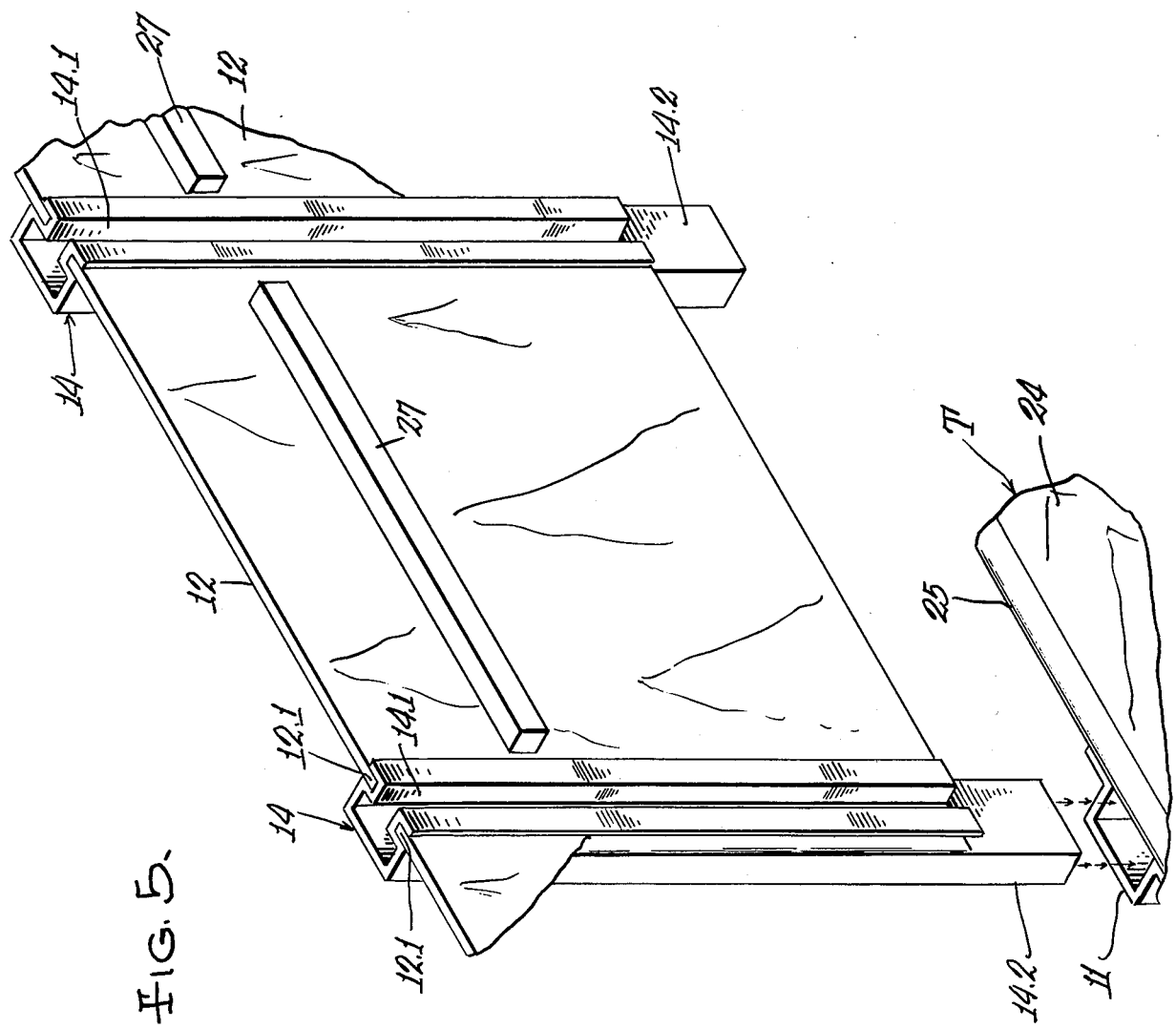
FIG. 5 is a fragmentary, separated perspective view of the foregoing construction.

FIGS. 1 and 2 disclose a flat bed trailer T of any commercially available form having fifth wheel connection F with a towing tractor Tr. It should be understood that my invention is not limited to a trailer, since it has equal applicability to the flat bed of a truck. In FIG. 2 a storage cabinet 10 is shown, used in the prior art to store panels when they are not erected to provide side walls for the trailer bed. The need for this cabinet is eliminated by my invention.

A 40-foot-long trailer (about 11 meters) is not uncommon in present-day freight hauling, and such trailer has stake pockets 11 along its periphery, usually spaced two feet apart. The panels 12 are generally a little less than 4 feet (about 1.2 meters) long, and their height is less than one-half of the transverse width of the bed. The panels may be formed of plywood and generally are about ½" (12.7 millimeters) thick, although this may vary.

Stakes 14 are adapted to have their lower end fit into a stake pocket. These stakes are of metal and a frequently used cross section is that shown in FIG. 4. Such stakes have spaced, back-to-back U-shaped sections 14.1, each to receive the upright side marginal portion 12.1 of a panel 12. As seen in FIG. 5, the U-shaped sections 14.1 terminate before reaching the lower end of the stake 14, to leave a lower stake portion 14.2 that closely fits within a stake pocket 11. The lower margins of the U-shaped sections 14.1 engage the upper surface of the bed to limit downward movement of the stake in a stake pocket. In FIGS. 1 and 2 stakes 14 are engaged in every second stake pocket 11, so the panels 12 are a little less than 4 feet long.

The trailer bed comprises a pair of sturdy I-beams which are laterally spaced and extend the full longitudinal length of the bed. As shown in my said previous patent, U.S. Pat. No. 3,481,627, the upper flanges of the beams 20 cooperate with extrusions 21 to form a pair of longitudinally-disposed troughs 22. Cross chanels 23 are welded to the beams 20 at longitudinally-spaced places to provide support for the wooden flooring 24. Channels 25 are welded to the outer ends of the outermost cross channels 23, and the stake pockets are welded to the channels 25. A rub rail 26 is welded to the outer surface of the stake pockets to provide a smooth peripheral surface.

As seen in FIG. 5 each panel 12 is formed with a longitudinally-extending cleat 27. If it is desired to transform the trailer to a flat bed, the stakes 14 are removed from the stake pockets 11, and the respective panels 12 are disposed flatwise on the wooden floor 24, with the cleats 27 on the panels on the left-hand side of the bed (as viewed in FIG. 3) fitting in the left-hand trough 22 and the cleats 27 on the panels on the right-hand side of the bed fitting in the right-hand trough 22. This keeps the panels from shifting transversely of the bed.

A load L, shown in dotted lines in FIG. 8, may be deposited on top of the stored panels, and since the stake pockets are now accessible, a chain and binder C shown in dot-dash lines in FIG. 8, may hold the load, and the panels 12, on top of the wooden floor. If the trailer is without a load, the panels may be held down by placing a pair of 2×4's 30 (see FIG. 8) on top of the panels, and utilizing a chain and binder 31 to press the 2×4's against the panels, and hold the latter to the floor of the trailer bed.

Since the vertical margins of adjoining panels 12 are spaced by the U-shaped sections 14.1 of the stakes 14, the panels when laid on the wooden floor 24 will have transversely-extending spaces 32 therebetween, as seen in FIG. 6. In order to provide a smooth floor over which a lift truck or the like may be run, filler strips 33 (see FIG. 7) may be deposited in the spaces 32 to fill the gap between panels.

The stakes 14, when removed from the stake pockets 11, must be stored, either in the prior way of operation or in my improved manner. A storage rack 35 (see FIG. 2) may be provided at the rear of the cab. This rack may also store the filler strips 33, and the panels 12 at the front and rear ends of the bed.

DESCRIPTION OF OTHER EMBODIMENT

It is not always desirable to have spaces 32 (FIG. 6) between panels 12 when the latter rest on the trailer floor, and the embodiment now to be described eliminates this requirement and also reduces the cost of construction. Referring to FIGS. 9 through 12, this embodiment utilizes a plain stake member 40, devoid of any pockets (like the U-shaped sections 14.1 previously described).

Thus, the stake 40 may be tubular and rectangular in cross section throughout its length, any suitable means being employed to limit the amount the lower end of the stake extends through a stake pocket 41. Welded to the upper end of each stake is the body 42 of an angle member to provide a foot 43 spaced from the adjoining side of the stake an amount to closely receive the upper marginal portions 44 of adjoining panels 45. It will therefore be seen that the upright margins of adjoining panels will now abut, either in upright position of the panels, or in the position when the panels lie flat on the trailer bed. Filler strips, such as those heretofore designated as 33, are no longer required. To hold the lower marginal portions of the panels against lateral movement, a rib 46 is secured to the upper flange of the channel 25 by welding, or secured or formed in any suitable manner. The rib is spaced inwardly of the web of the channel 25 an amount so that the lower marginal portion of the panel is confined between the rib 46 and the inner face of the stake 40, as best seen in FIG. 10. The rib 46 should be of a height substantially equal to the thickness of the panel, to present a flush joint (as seen in FIG. 12) when the panels lie flatwise on the trailer bed.

Instead of two longitudinally-extending troughs (formed by the extrusions 21 as shown in FIGS. 3 and 8) a single longitudinal opening 50 may be formed at the center of the bed (as shown in FIG. 9) to receive the cleats 51 which are positioned near the top of the panels 45. In this upper position, the cleats tend to reinforce the panels against buckling. The cleats may be disposed closer to the lower portions of the panels, as shown in dotted lines at 52 in FIG. 9, in which case the longitudinal openings in the bed are correspondingly located, as shown at 53 in dotted lines in FIG. 9.

The ribs 46 in cooperation with the adjoining portion of the stake 40, tend to hold the lower margin of the panel against buckling. As a further reenforcement, wooden stakes 54 (see FIG. 2) may be inserted in the stake pockets intermediate the pockets in which the stakes 14 or 40 are inserted.

The construction shown in FIGS. 9 through 12 is not only less costly to produce but it also provides the advantage of better protection against the weather. The rib 46 makes a weather protecting strip because of its fairly close fit with the lower marginal portion of the panels 45. As seen in FIG. 11 certain ones (or all) of the angle member bodies 42 are formed with a round hole 55 therein to pass the downturned end legs 56 of a tarpaulin bow 57, as seen in FIG. 9. A tarpaulin 58 (shown in dotted lines in FIG. 9) is supported by the tarpaulin bows which are spaced longitudinally of the bed. The longitudinal sides 59 of the tarpaulin are held down by ropes 60 which are tied around the rub rails 26.

The cleats 27 or 51 may be of a length substantially equal to the length of the panels (as seen in FIGS. 5 and 11) or they may be a series of lugs. In case of the lugs, the trailer bed may be formed with recesses to fairly closely receive the lugs, so that the longitudinal troughs are not necessary. However, the lugs could fit within the longitudinal troughs to perform the same as the cleats.

I claim:

1. A roadway vehicle having an elongated bed supported by road-engaging wheels, said bed having a generally flat upper surface formed with recess means therein, and said bed having a plurality of stake pockets spaced apart along a peripheral edge, the improvement comprising:
   a plurality of generally flat rigid panels of rectangular shape, each having abutment means extending from a side surface,
   a plurality of stakes, each adapted to have its lower end fit into a respective stake pocket for support of said stake in an upright manner, each stake having means for removably receiving a portion of a panel for supporting the panels in an upright edge-to-edge manner whereby said plurality of panels form side panels for said bed,
   said stakes being bodily removable from said stake pockets and said panels being bodily disengageable from said stakes, whereby said stakes may be stored on said vehicle and said panels bodily disposed flatwise on said flat upper surface of said bed with said side surface lowermost, said abutment means on respective ones of said panels being received within said recess means in said upper surface, said abutment means and marginal portions of said recess means having interfitting engagement to hold said panels against substantial lateral shifting,
   said panels in flatwise position on said bed being stored for subsequent side panel use while providing a flat bed for supporting a load.

2. The construction according to claim 1 wherein said recess means in said bed surface is an elongated trough extending longitudinally of said bed.

3. The construction according to claim 1 wherein said bed includes a pair of laterally-spaced, longitudinally-extending steel I-beam support members, the upper flange of each beam being substantially flush with the upper flat surface of said bed,
   a pair of elongated metal members within said bed, each cooperating with the upper flange of a respective I-beam to form a longitudinally-extending trough therebetween, each of said troughs forming the means for receiving said abutment means.

4. The construction according to claim 3 wherein each panel has an elongated cleat as its abutment means, each cleat fitting lengthwise within said trough.

5. The construction according to claim 1 wherein each stake has a pair of back-to-back channels which are disposed in upright manner when the stake is supported within a stake pocket, each channel receiving a respective marginal portion of adjoining panels to hold said panels in upright position.

6. The construction according to claim 1 wherein each stake has a body portion of an angle member secured to its upper end, each angle member having a foot extending downwardly from said body portion and spaced from the adjoining surface of said stake an amount to closely receive an upper margin of each of the adjoining panels therebetween.

7. The construction according to claim 6 wherein a rib extends upwardly from said upper surface of said bed adjacent to each of said stakes to receive therebetween a lower marginal portion of a panel.

8. The construction according to claim 6 wherein a hole is formed in said body portion to receive a down-turned leg of a tarpaulin bow.

9. The construction according to claim 2 wherein a pair of elongated troughs are located substantially equidistant from the longitudinal centerline of said bed,
   each of said panels being of a vertical dimension which is equal to approximately one-half the width of said bed, whereby said panels may be disposed flatwise on said bed to substantially cover the width thereof,
   each panel having a longitudinally-extending cleat adapted to fit lengthwise within the trough on its side of the bed to hold the panel against substantial shifting flatwise of said bed.

10. The construction according to claim 2 wherein said elongated trough is located substantially midway between opposite longitudinal sides of said bed,
    each of said panels being of a vertical dimension which is equal to approximately one-half of the width of said bed, whereby panels on opposite sides of said bed may be disposed flatwise on said bed to substantially cover the width thereof,
    each panel having a longitudinally-extending cleat adapted to fit lengthwise within said trough to hold the panels against substantial shifting flatwise of said bed.

* * * * *